US012320152B2

(12) United States Patent
Li et al.

(10) Patent No.: US 12,320,152 B2
(45) Date of Patent: *Jun. 3, 2025

(54) CODE WHEEL COMBINATION LOCK

(71) Applicant: XIAMEN MAKE SECURITY TECHNOLOGY CO., LTD., Fujian (CN)

(72) Inventors: Yijian Li, Xiamen (CN); Shaolian Lin, Xiamen (CN)

( * ) Notice: Subject to any disclaimer, the term of this patent is extended or adjusted under 35 U.S.C. 154(b) by 386 days.

This patent is subject to a terminal disclaimer.

(21) Appl. No.: 17/783,637

(22) PCT Filed: Feb. 17, 2020

(86) PCT No.: PCT/CN2020/075523

§ 371 (c)(1),
(2) Date: Dec. 13, 2022

(87) PCT Pub. No.: WO2021/163840

PCT Pub. Date: Aug. 26, 2021

(65) Prior Publication Data

US 2023/0127631 A1 Apr. 27, 2023

(51) Int. Cl.
*E05B 37/00* (2006.01)
*E05B 37/02* (2006.01)

(52) U.S. Cl.
CPC ...... *E05B 37/0079* (2013.01); *E05B 37/0034* (2013.01); *E05B 37/0055* (2013.01); *E05B 37/02* (2013.01)

(58) Field of Classification Search
CPC ............. E05B 37/0075; E05B 37/0079; E05B 37/0082; E05B 37/02; E05B 37/0034;
(Continued)

(56) References Cited

U.S. PATENT DOCUMENTS

2017/0114567 A1* 4/2017 Taylor ................. E05B 37/0058
2023/0022564 A1* 1/2023 Li ....................... E05B 37/0075

FOREIGN PATENT DOCUMENTS

CN 109184337 A * 1/2019 ............. E05B 15/00
DE 202009010324 U1 * 1/2011 ........... E05B 13/103

* cited by examiner

*Primary Examiner* — Christine M Mills
*Assistant Examiner* — Peter H Watson

(57) ABSTRACT

Disclosed in the present invention is a novel code wheel combination lock, comprising a knob and a face plate that can rotate with respect to each other, a lock tongue, and a code wheel assembly. The code wheel assembly comprises a base having an accommodation cavity, a code wheel shaft, several sets of bushings and code wheels, a reset mechanism, a positioning member, and a protection frame; the base is mounted on the face plate; the code wheel shaft passes through a movement cavity and can axially moves; the bushings are sleeved on the code wheel shaft and can rotate together with the code wheel shaft or with respect to the code wheel shaft; the code wheels are sleeved on the bushings and can rotate together with the bushings or with respect to the bushings; the reset mechanism is used for resetting the code wheels; the positioning member is used for limiting reset of the code wheels; the protection frame is used for changing the matching mode between the code wheels and the bushings; in the rotation of the knob and the face plate with respect to each other, there are a first position, a second position and a third position to respectively implement the functions of locking, automatic code wheel reset, and manual password setting. The present invention has a function of automatically resetting the code wheels after unlocking and before locking, thereby improving the product safety and preventing password exposure.

10 Claims, 14 Drawing Sheets

(58) Field of Classification Search
CPC ............. E05B 37/0031; E05B 37/0048; E05B 37/0055; E05B 37/0041; E05B 37/0058
See application file for complete search history.

CODE WHEEL COMBINATION LOCK

FIELD OF THE INVENTION

The present invention relates to a combination lock, and more particularly to a novel code wheel combination lock.

DESCRIPTION OF THE PRIOR ART

A combination lock has the convenience of an electronic code lock and the stability of a mechanical lock, so it is widely used. In general, a conventional combination lock on the market keeps the password unchanged when unlocking. After locking, it is necessary to scramble the password manually to prevent the password from being exposed. There is a security risk of password exposure.

SUMMARY OF THE INVENTION

Technical Problem

The primary object of the present invention is to provide a novel code wheel combination lock, which has the function of automatic code wheel reset after unlocking and before locking, so as to improve the security of the product and prevent password exposure.

Solution to the Problem

Technical Solution

In order to achieve the above-mentioned object, the solutions of the present invention are described below.

A novel code wheel combination lock comprises a knob that is rotatable relative to a face plate, a lock tongue, and a code wheel assembly. The knob has an accommodation cavity. The face plate is pivotally connected to the accommodation cavity. The lock tongue is mounted to a side wall of the accommodation cavity.

The code wheel assembly includes a base having a movement cavity, a code wheel shaft, a plurality of sets of bushings and code wheels, a reset mechanism, a positioning member, and a protection frame. The base is mounted to the face plate and located in the accommodation cavity. The code wheel shaft passes through the movement cavity and is movable axially relative to the movement cavity, in cooperation with the lock tongue to realize unlocking and locking. The bushings are sleeved on the code wheel shaft, and are selectively stationary or rotatable relative to the code wheel shaft along with axial movement of the code wheel shaft. The code wheels are disposed corresponding to the bushings, and selectively rotate together with the bushings or rotate relative to the bushings. The reset mechanism is configured to reset the code wheels. The positioning member is mounted to the base and disposed opposite to the code wheels for restricting reset of the code wheels. The protection frame is mounted to the base and is movable axially relative to the base, for changing the code wheels to rotate together with the bushings or to rotate relative to the bushings.

Relative rotation of the knob and the face plate drives the code wheel shaft and the protection frame to move axially and enables the positioning member to restrict or unlock rotation of the code wheels so that the knob can be rotated relative to the face plate to a first position, a second position, or a third position. In the first position, the code wheel shaft cannot move and is mutually restricted with the lock tongue.

When a password is correct, the bushings can rotate relative to the code wheel shaft, the code wheels can rotate together with the bushings, and the positioning member restricts reset of the code wheels. In the second position, the bushings can rotate relative to the code wheel shaft, the code wheels can rotate together with the bushings, and the positioning member doesn't restrict reset of the code wheels, so as to achieve automatic code wheel reset. In the third position, the bushings are stationary relative to the code wheel shaft, the code wheels can rotate relative to the bushings, and the positioning member restricts reset of the code wheels, so as to achieve manual password setting.

The reset mechanism further includes code wheel magnets and a reset magnet. The code wheel magnets are disposed corresponding to the code wheels. The reset magnet is configured to attract the code wheel magnets for resetting the code wheels. The code wheel magnets are arranged in pairs. The code wheels each include one pair of the code wheel magnets with opposite poles. The reset magnet is arranged along an axial direction of the code wheel shaft and is mounted to the code wheel shaft.

An outer circumference of the code wheel shaft has a plurality of first raised blocks. The bushings correspond to the first raised blocks one by one. An inner wall of each of the bushings is formed with a first engaging groove opposite to a corresponding one of the first raised blocks. The corresponding first raised block is movably fitted in the first engaging groove along with movement of the code wheel shaft.

An outer circumference of each of the bushings has a plurality of restricting protrusions arranged at equal intervals. An inner wall of each of the code wheels has restricting grooves corresponding in position to the restricting protrusions. The restricting protrusions are movably fitted in the restricting grooves.

A side wall of the movement cavity is formed with code wheel grooves corresponding to the respective code wheels. The code wheel grooves are configured to make way for the code wheels to rotate and prevent the code wheels from moving axially in the movement cavity. The code wheel assembly further includes a code wheel shaft spring and a protection frame spring disposed at one end of the code wheel shaft, away from the lock tongue, to provide an elastic force for the code wheel shaft and the protection frame to move axially. The code wheel assembly further includes a spring mounting seat. The spring mounting seat is disposed between the end of the code wheel shaft away from the lock tongue and the side wall of the accommodation cavity. The code wheel shaft spring and the protection frame spring are mounted to the spring mounting seat.

The first position, the second position and the third position are arranged in sequence, so that the knob is rotated relative to the face plate to achieve functions of unlocking, automatic code wheel reset and manual password setting in turn when unlocked and to achieve the function of automatic code wheel reset when locked.

The novel code wheel combination lock further comprises a lock tongue spring. The side wall of the accommodation cavity has a rotation rail. The lock tongue is mounted at one end of the rotation rail and is movable in a direction perpendicular to the rotation rail. The lock tongue spring is disposed between the lock tongue and a bottom of the accommodation cavity. One end of the code wheel shaft is movably fitted between both ends of the rotation rail. One end of the rotation rail, close to the lock tongue, is defined as the first position. The other end of the rotation rail, away from the lock tongue, is defined as the third position.

Two sides of the lock tongue have an unlocking slope and a locking slope, respectively. The unlocking slope faces an unlocking direction of the code wheel shaft, so that the lock tongue provides a component force for moving the code wheel shaft axially along with rotation of the knob. The locking slope faces a locking direction of the code wheel shaft, so that the code wheel shaft provides a component force for lowering the lock tongue along with rotation of the knob.

The novel code wheel combination lock further comprises an upper rail, a lower rail and a rail spring that are installed on the side wall of the accommodation cavity. The upper rail and the lower rail are arranged opposite to each other to form the rotation rail. An inner side of the upper rail has a first receiving groove for the protection frame to move axially. A slide slope is connected between the first receiving groove and the inner side of the upper rail. The slide slope is disposed between the second position and the third position. The lower rail is disposed opposite to the first receiving groove. The rail spring is disposed between the lower rail and the bottom of the accommodation cavity. One end of the lower rail, close to the lock tongue, has a press slope. When the protection frame is moved axially to lean against the press slope, the lower rail presses the rail spring down to make way for the protection frame.

The code wheel assembly further includes a positioning member spring. The positioning member is pivotally connected to the base. One side of the positioning member has pawls corresponding to the code wheels. A third engaging groove is defined between every adjacent two of code words of each of the code wheels. The pawls are opposite to the third engaging grooves of the code wheels, respectively. The positioning member spring is disposed between another side of the positioning member and the base to provide an elastic force to drive the positioning member to rotate for the pawls to be engaged in the third engaging grooves of the code wheels, respectively. A bottom of the accommodation cavity has an unlocking lug. The unlocking lug is opposite to the other side of the positioning member. The positioning member movably cooperates with the unlocking lug along with rotation of the knob. When the positioning member is in contact with the unlocking lug, the pawls are disengaged from the third engaging grooves of the code wheels. The unlocking lug is located between the first position and the second position.

The novel code wheel combination lock further comprises a lock cylinder and a link assembly. The lock cylinder is mounted to the face plate and inserted in the accommodation cavity. The link assembly is disposed at an inner end of the lock cylinder and is opposite to the lock tongue. When a correct key is inserted in the lock cylinder, the lock cylinder is rotated to drive the lock tongue to move through the link assembly, so as to unlock the code wheel shaft. The link assembly includes a push block and a drive block. The push block is slidably fitted at a bottom of the accommodation cavity and is movable along a circumferential direction of the accommodation cavity. The push block has a second receiving groove to make way for the rail spring. The drive block is mounted to the inner end of the lock cylinder and configured to drive the push block to move along with rotation of the lock cylinder.

The code wheel assembly further includes a probe member. The probe member is pivotally connected to the base. One side of the probe member has a plurality of probes corresponding to the respective bushings. Each of the bushings has a probe groove corresponding to a corresponding one of the probes. When the lock cylinder is rotated, the drive block drives the probe member to rotate for the probes to be in contact with surfaces of the respective bushings. When the password is correct, the probes are inserted into the probe grooves of the bushings, respectively.

The face plate has a marked dot corresponding to the third position. The knob has an indication dot for indicating a current rotational position.

BENEFICIAL EFFECT OF THE INVENTION

Beneficial Effect

With the above solutions, the present invention realizes the function of changing the password through the axial movement of the code wheel shaft and the protection frame. Through the action change of the positioning member, in cooperation with the reset mechanism to realize automatic code wheel reset, the product can automatically scramble the password after unlocking and before locking each time. This reduces the risk of exposing the password greatly and prevents the user from forgetting to scramble the password when the lock is locked.

BRIEF DESCRIPTION OF THE DRAWINGS

Description of the Drawings

Figure 1:
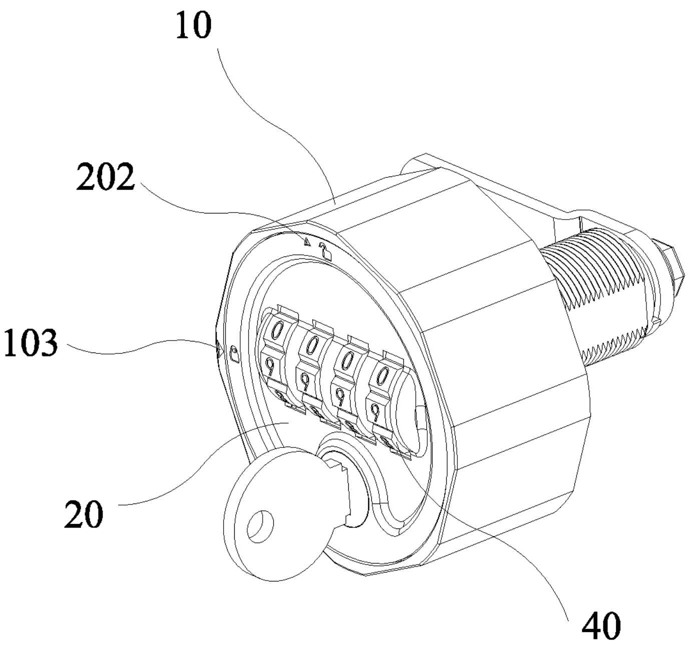
Figure 2:
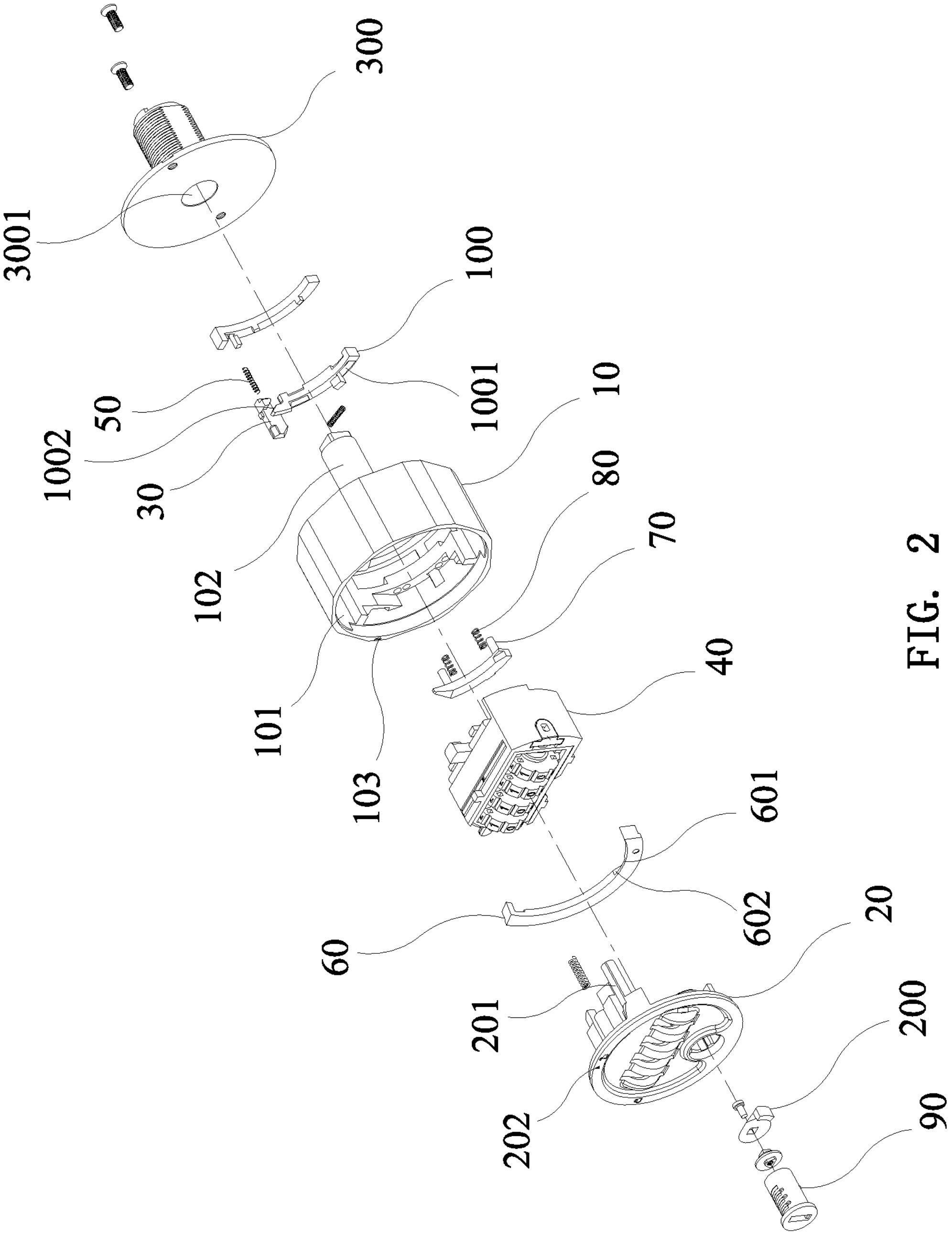
Figure 3:
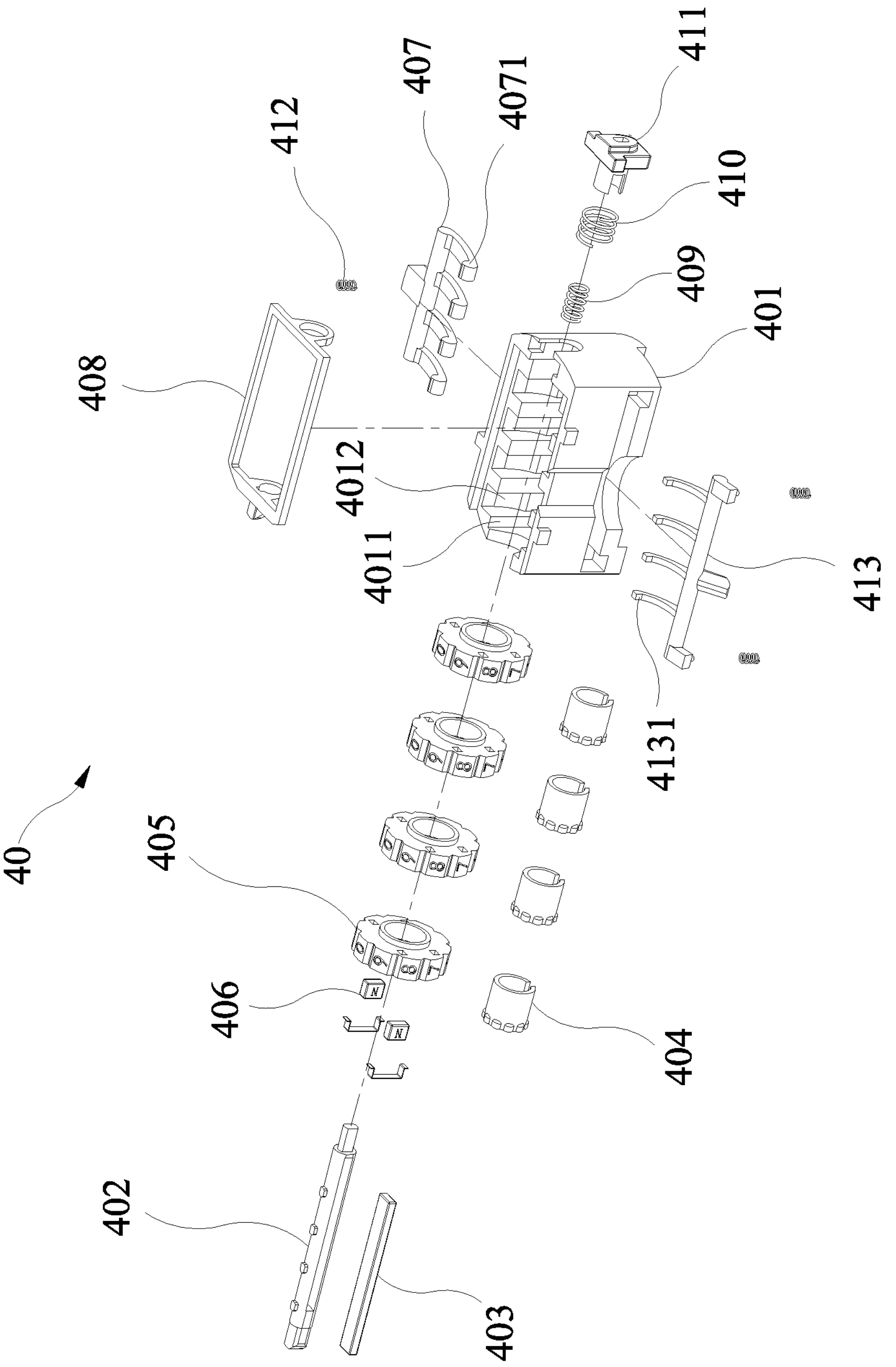
Figure 4:
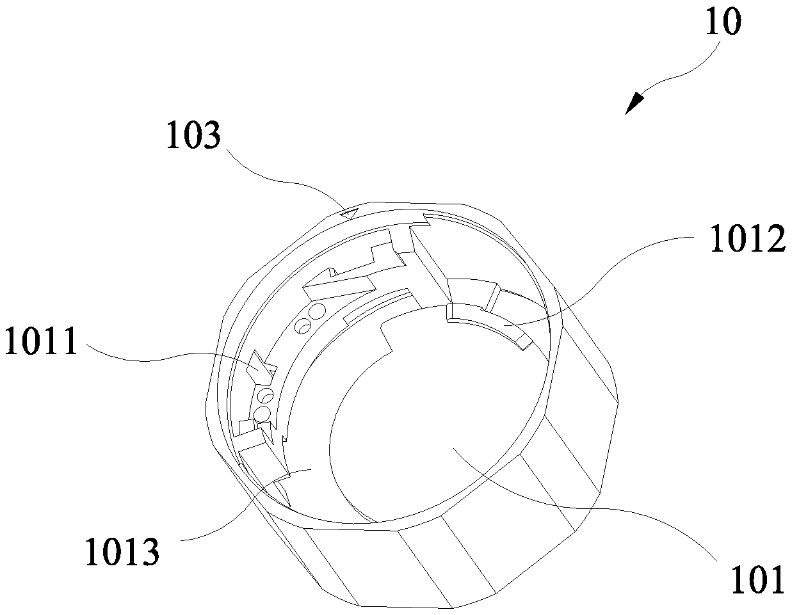
Figure 5:
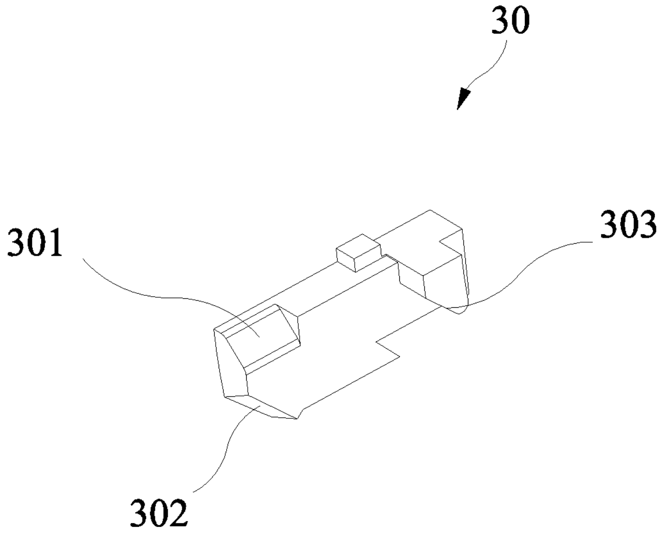
Figure 6:
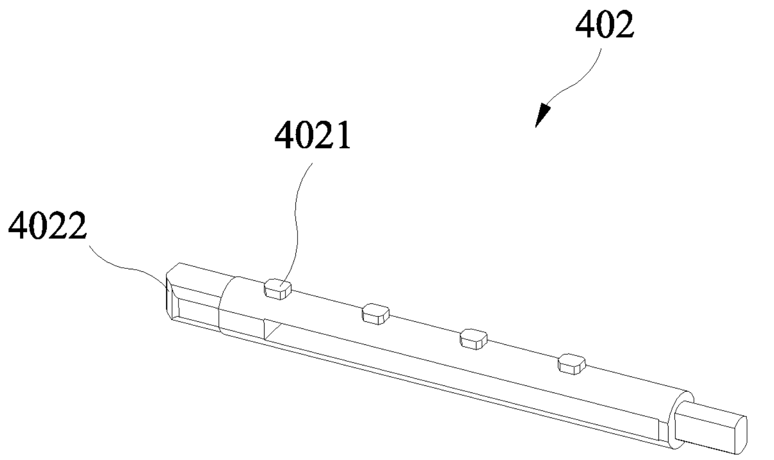
Figure 7:
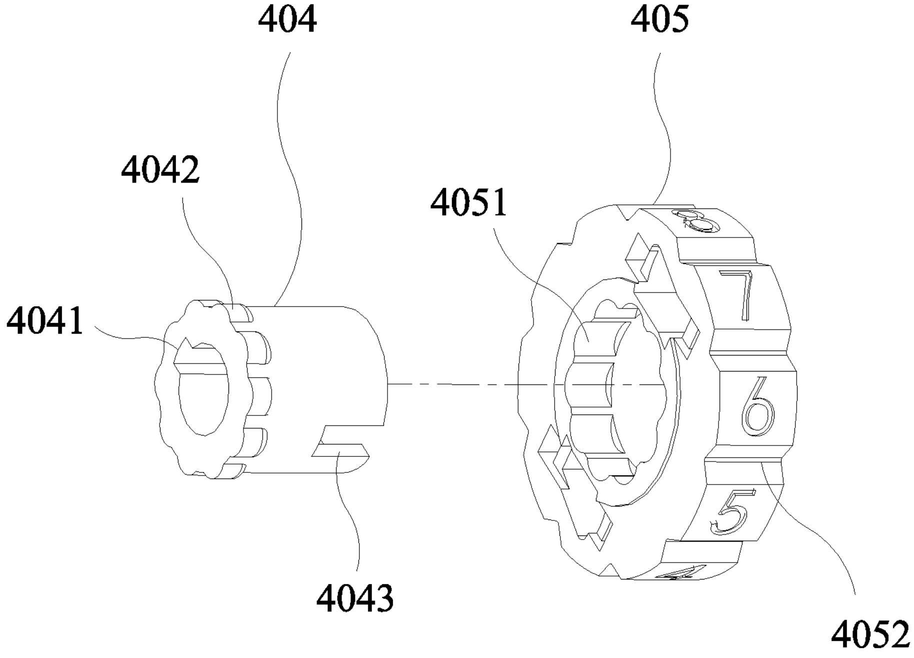
Figure 8:
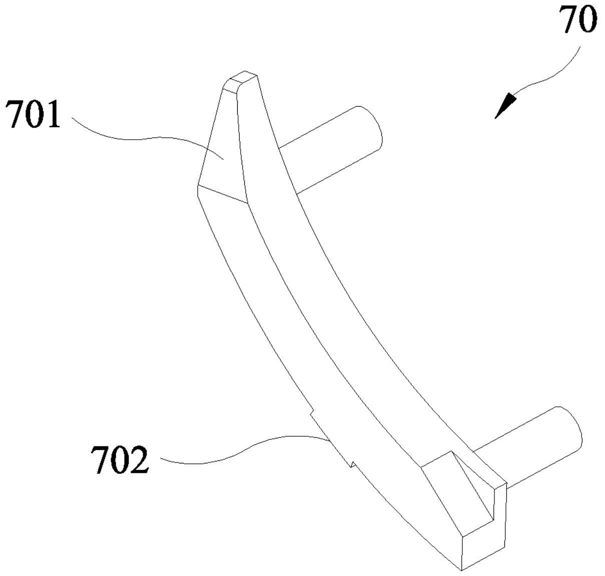
Figure 9:
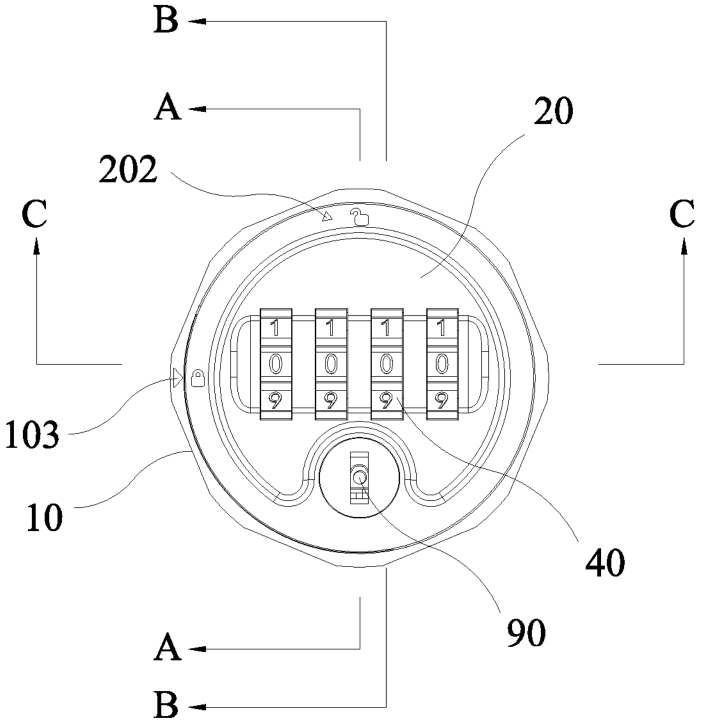
Figure 10:
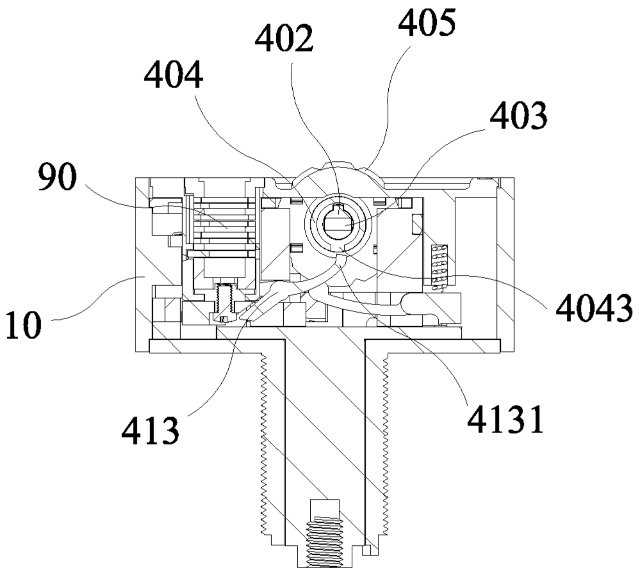
Figure 11:
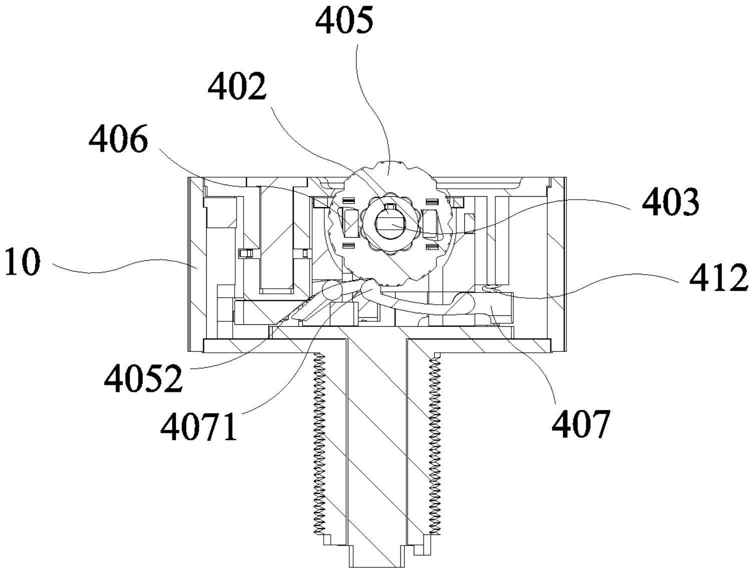
Figure 12:
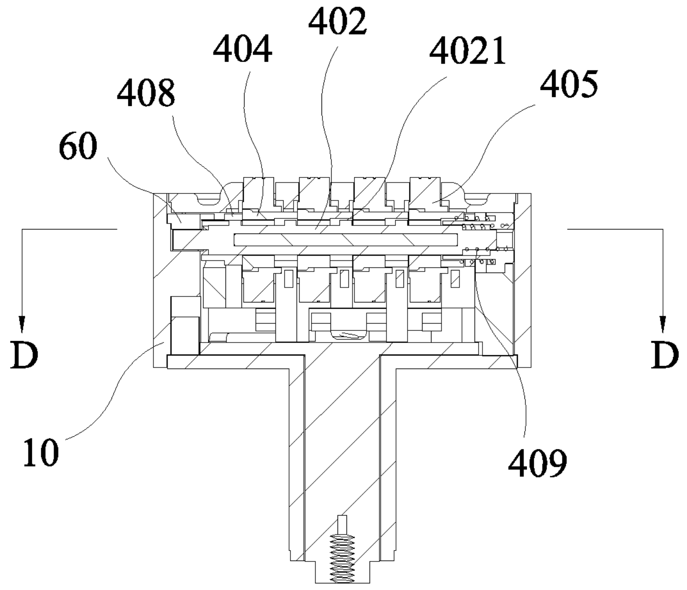
Figure 13:
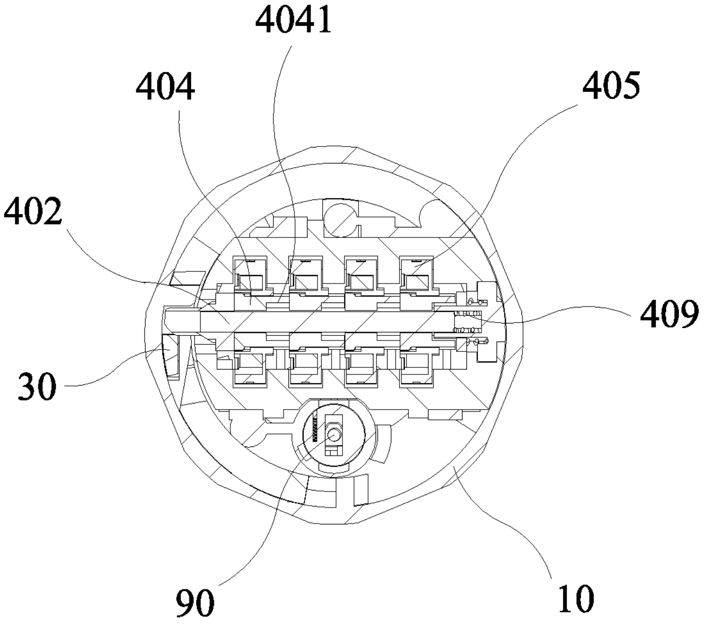
Figure 14:
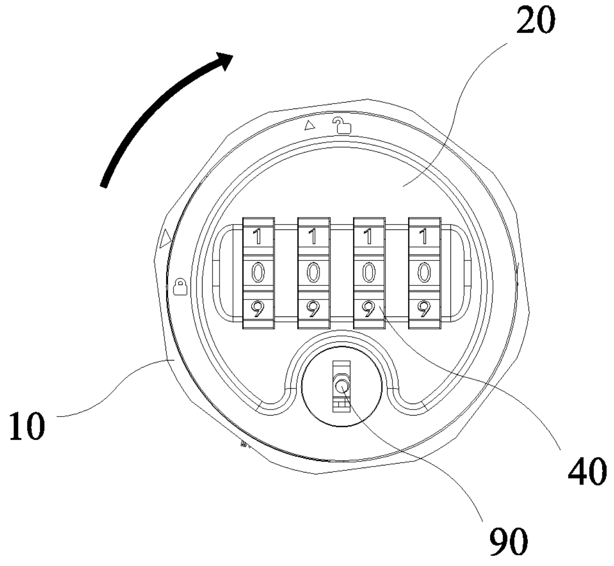
Figure 15:
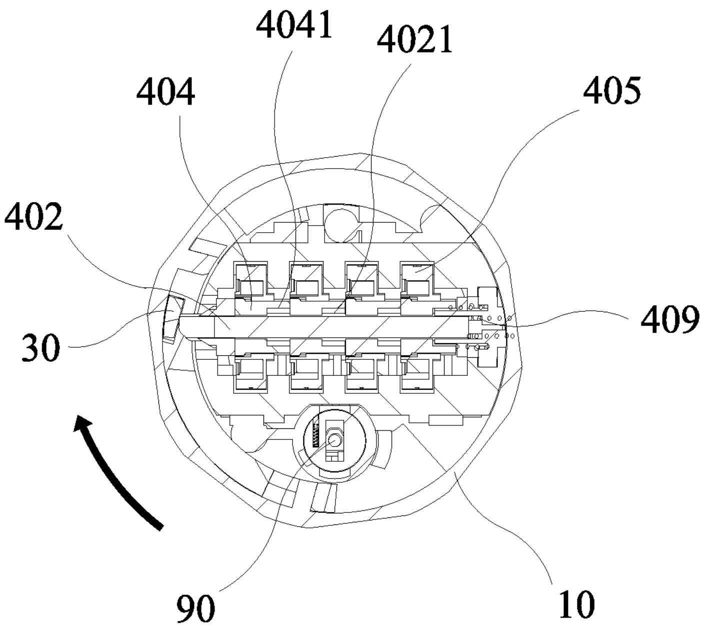
Figure 16:
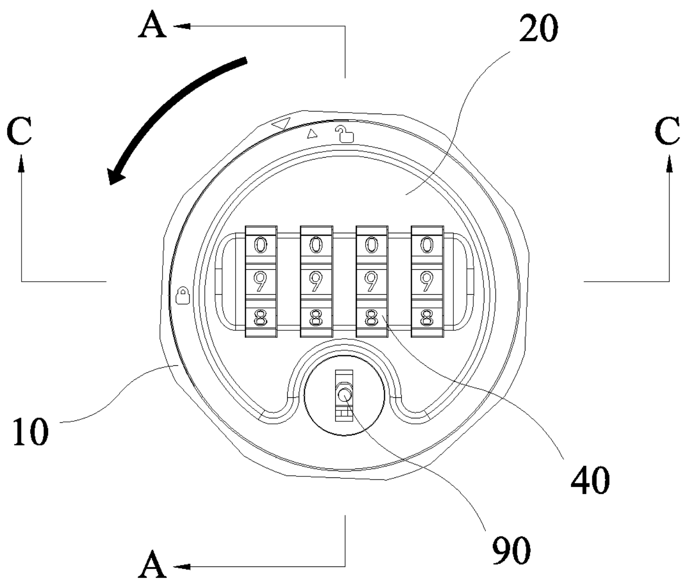
Figure 17:
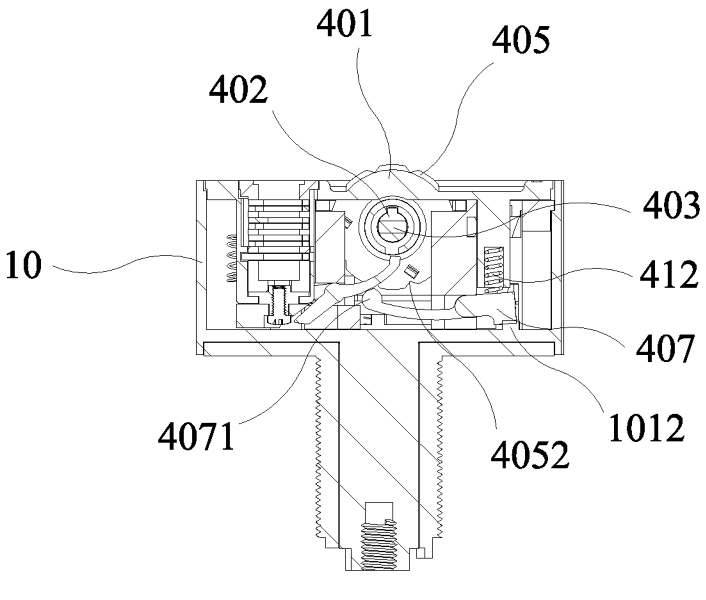
Figure 18:
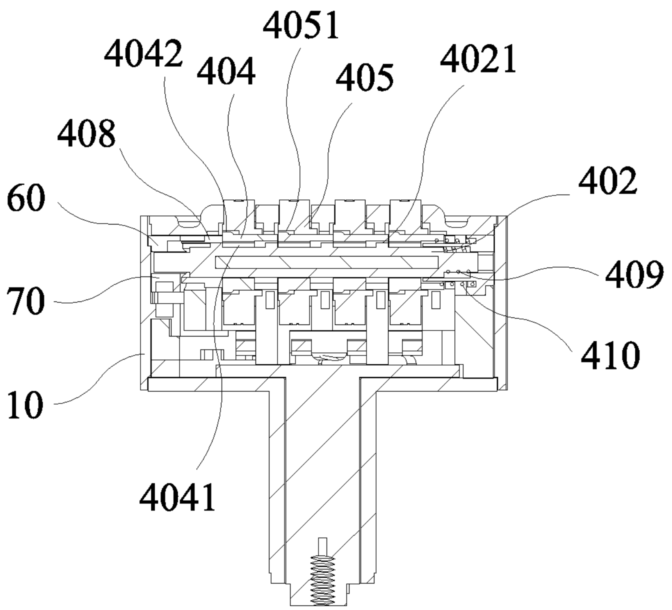
Figure 19:
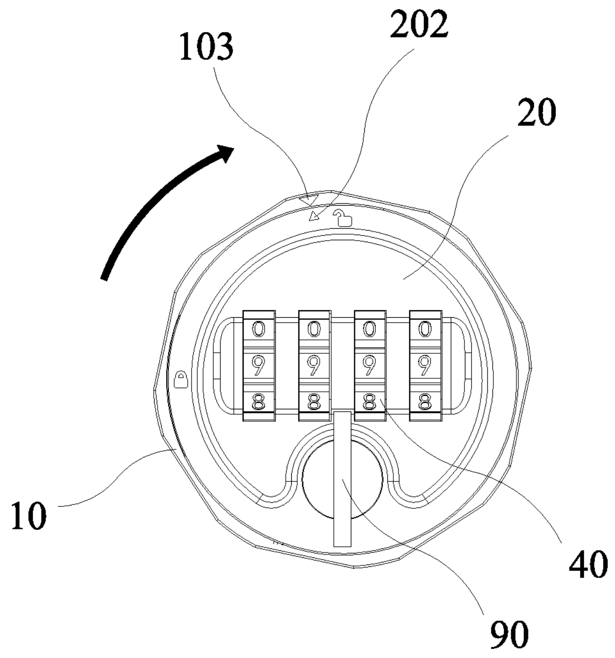
Figure 20:
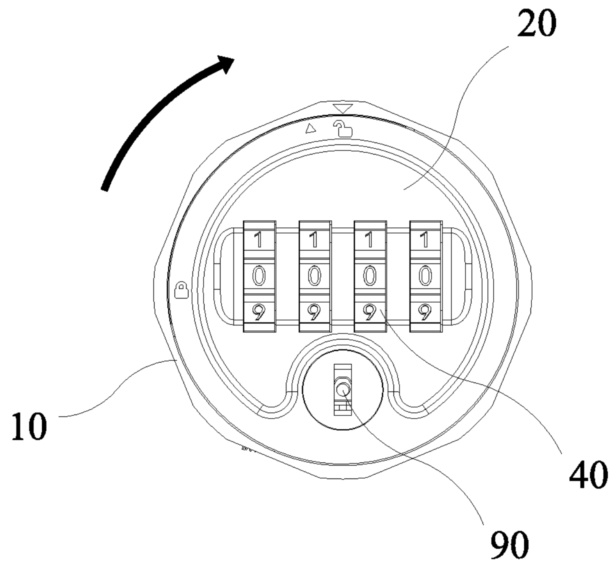
Figure 21:
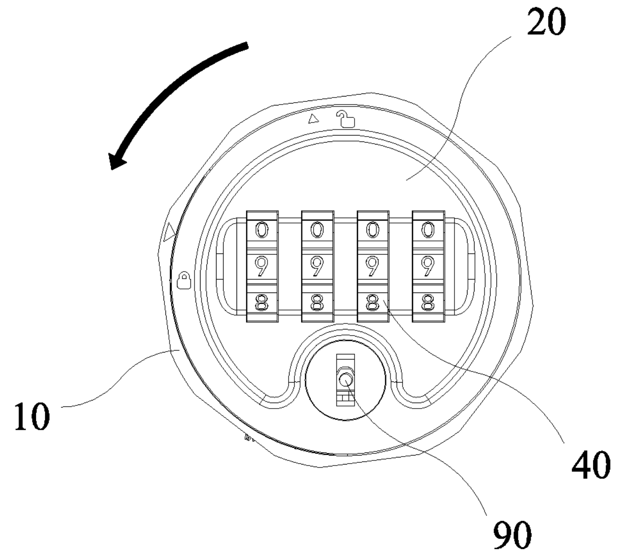
Figure 22:
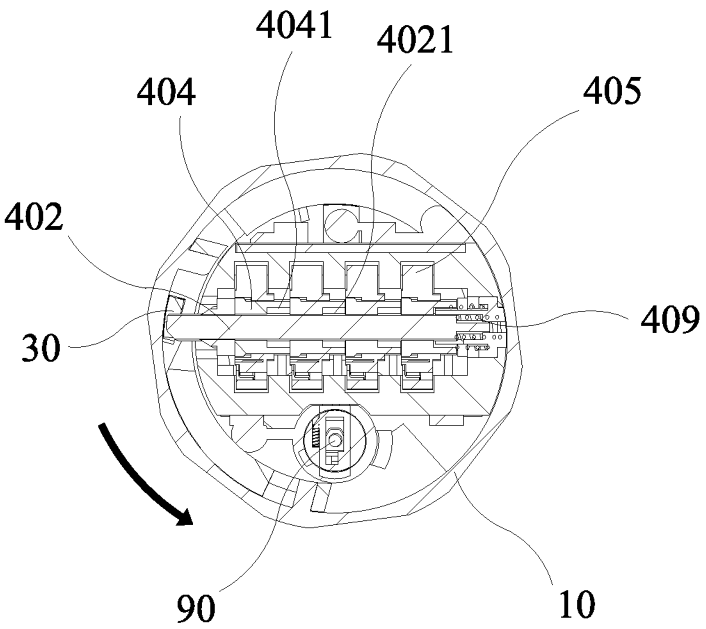
Figure 23:
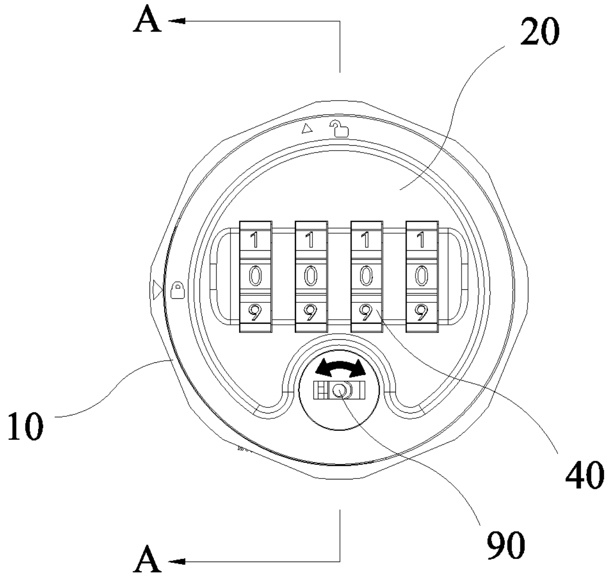
Figure 24:
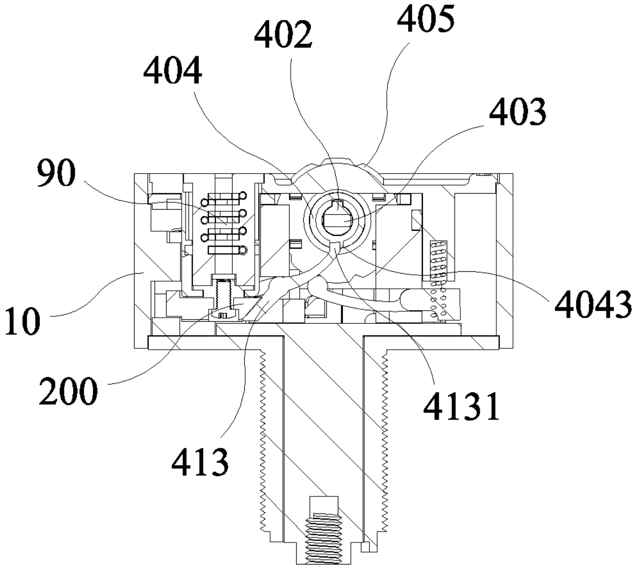

FIG. 1 is a perspective view of a preferred embodiment of the present invention;

FIG. 2 is an exploded view of the preferred embodiment of the present invention;

FIG. 3 is an exploded view of the code wheel assembly of the preferred embodiment of the present invention;

FIG. 4 is a perspective view of the knob of the preferred embodiment of the present invention;

FIG. 5 is a perspective view of the lock tongue of the preferred embodiment of the present invention;

FIG. 6 is a perspective view of the code wheel shaft of the preferred embodiment of the present invention;

FIG. 7 is a perspective view of the code wheel and the bushing of the preferred embodiment of the present invention;

FIG. 8 is a perspective view of the lower rail of the preferred embodiment of the present invention;

FIG. 9 is a front view of the preferred embodiment of the present invention in an initial state;

FIG. 10 is a cross-sectional view taken along line A-A of FIG. 9;

FIG. 11 is a cross-sectional view taken along line B-B of FIG. 9;

FIG. 12 is a cross-sectional view taken along line C-C of FIG. 9;

FIG. 13 is a cross-sectional view taken along line D-D of FIG. 12;

FIG. 14 is a front view of the preferred embodiment of the present invention in an unlocked state;

FIG. 15 is a structural schematic view of the preferred embodiment of the present invention in an unlocked state;

FIG. 16 is a front view of the preferred embodiment of the present invention in an automatic code wheel reset state;

FIG. 17 is a cross-sectional view taken along line A-A of FIG. 16;

FIG. 18 is a cross-sectional view taken along line C-C of FIG. 16;

FIG. 19 is a front view of the preferred embodiment of the present invention when a password is to be input;

FIG. 20 is a front view of the preferred embodiment of the present invention in a manual password setting state;

FIG. 21 is a front view of the preferred embodiment of the present invention in a locked state;

FIG. 22 is a structural schematic view of the preferred embodiment of the present invention in a locked state;

FIG. 23 is a front view of the preferred embodiment of the present invention in a state of using a key to look for the password; and FIG. 24 is a cross-sectional view taken along line A-A of FIG. 23.

Description of Reference Numbers: knob 10; accommodation cavity 101; second engaging groove 1011; unlocking lug 1012; arc-shaped hole 1013; rotating shaft 102; indication dot 103; face plate 20; connecting post 201; marked dot 202; lock tongue 30; unlocking slope 301; locking slope 302; second downward pressing slope 303; code wheel assembly 40; base 401; movement cavity 4011; code wheel groove 4012; code wheel shaft 402; first raised block 4021; guide slope 4022; reset magnet 403; bushing 404; first engaging groove 4041; restricting protrusion 4042; probe groove 4043; code wheel 405; restricting groove 4051; third engaging groove 4052; code wheel magnet 406; positioning member 407; pawl 4071; protection frame 408; code wheel shaft spring 409; protection frame spring 410; spring mounting seat 411; positioning member spring 412; probe member 413; probe 4131; lock tongue spring 50; upper rail 60; first receiving groove 601; slide slope 602; lower rail 70; press slope 701; second raised block 702; rail spring 80; lock cylinder 90; push block 100; second receiving groove 1001; first downward pressing slope 1002; drive block 200; bottom plate 300; shaft hole 3001

DETAILED DESCRIPTION OF THE PREFERRED EMBODIMENTS

Implementation of the Invention

Embodiments of the present invention will now be described, by way of example only, with reference to the accompanying drawings.

The present invention discloses a novel code wheel combination lock, comprising a knob 10 that is rotatable relative to a face plate 20, a lock tongue 30, and a code wheel assembly 40.

The knob 10 has an accommodation cavity 101 therein.

The face plate 20 is pivotally fitted at the opening of the accommodation cavity 101.

The lock tongue 30 is mounted to the side wall of the accommodation cavity 101.

The code wheel assembly 40 comprises a base 401 having a movement cavity 4011, a code wheel shaft 402, a reset magnet 403, multiple sets of bushings 404, code wheels 405 and code wheel magnets 406, a positioning member 407, and a protection frame 408. The base 401 is mounted to the face plate 20 and located in the accommodation cavity 101. The code wheel shaft 402 passes through the movement cavity 4011 and is movable along an axial direction of the movement cavity 4011. One end of the code wheel shaft 402 is disposed opposite to the lock tongue 30 to realize unlocking and locking. The reset magnet 403 is mounted to the code wheel shaft 402. The bushings 404 are sleeved on the code wheel shaft 402 and can be selectively stationary or rotatable relative to the code wheel shaft 402 along with the axial movement of the code wheel shaft 402. The code wheels 405 are disposed corresponding to the bushings 404 and can selectively rotate together with the bushings 404 or rotate relative to the bushings 404. The code wheel magnets 406 are disposed corresponding to the code wheels 405. The positioning member 407 is mounted to the base 401 and disposed opposite to the code wheels 405 to restrict the code wheels 405 from rotating due to the mutual attraction between the reset magnet 403 and the code wheel magnets 406. The protection frame 408 is mounted to the base 401 and is movable along the axial direction of the base 401, so that the bushings 404 move relative to the code wheels 405 to change the cooperation relationship between the bushings 404 and the code wheels 405.

The relative rotation of the knob 10 and the face plate 20 drives the code wheel shaft 402 and the protection frame 408 to move along the axial direction of the base 401 and enables the positioning member 407 to restrict or unlock rotation of the code wheels 405. The knob 10 can be rotated relative to the face plate 20 to a first position, a second position and a third position.

In the first position, the code wheel shaft 402 cannot move and is mutually restricted with the lock tongue 30. When the password is correct, the bushings 404 can rotate relative to the code wheel shaft 402, the code wheels 405 can rotate together with the bushings 404, and the positioning member 407 restricts the rotation of the code wheels 405.

In the second position, the bushings 404 can rotate relative to the code wheel shaft 402, the code wheels 405 can rotate together with the bushings 404, and the positioning member 407 unlocks the rotation of the code wheels 405, so as to achieve automatic code wheel reset;

In the third position, the bushings 404 are stationary relative to the code wheel shaft 402, the code wheels 405 can rotate relative to the bushings 404, and the positioning member 407 restricts the rotation of the code wheels 405, so as to achieve manual password setting.

FIGS. 1 to 13 illustrate the specific embodiments of the present invention.

The accommodation cavity 101 is disposed at one end of the knob 10, and the other end of the knob 10 is a locking end.

The code wheel magnets 406 are arranged in pairs. Each code wheel 405 includes one pair of the code wheel magnets 406 with opposite poles.

The code wheel assembly 40 further includes an acceleration magnet (not shown in the figures). The acceleration magnet is mounted to the base 401 and arranged in parallel with the reset magnet 403 to increase the magnetic force for achieving the rapid reset of the code wheels 405.

The outer circumference of the code wheel shaft 402 has a plurality of first raised blocks 4021. The bushings 404 correspond to the first raised blocks 4021 one by one. The inner wall of each bushing 404 is formed with a first engaging groove 4041 opposite to the corresponding first raised block 4021. The corresponding first raised block 4021 is movably fitted in the first engaging groove 4041 along with the axial movement of the code wheel shaft 402. Normally, the first raised block 4021 and the first engaging groove 4041 are misaligned in the circumferential direction of the code wheel shaft 402. That is, the bushings 404 and the code wheel shaft 405 cannot perform relative axial movement, and they can only move relative to each other when the code wheels 405 are in a state that the password is correct, that is, the code wheel shaft 405 can move axially.

The outer circumference of each bushing 404 has a plurality of restricting protrusions 4042 arranged at equal intervals. The inner wall of each code wheel 405 has restricting grooves 4051 corresponding in position to the restricting protrusions 4042. The restricting protrusions

4042 are movably fitted in the restricting grooves 4051 to achieve a spline fit between the bushings 404 and the code wheels 405. When the password is to be set (manually or automatically), the restricting protrusions 4042 are disengaged from the restricting grooves 4051, that is, the bushings 404 and the code wheels 405 are rotatable relative to each other. After the password is set, the restricting protrusions 4042 are engaged in the restricting grooves 4051 so that the bushings 404 and the code wheels 405 are relatively stationary, which ensures that only the code words of the correct password on the code wheels 405 correspond to the first engaging grooves 4041 of the bushings 404.

The side wall of the movement cavity 4011 is formed with code wheel grooves 4012 corresponding to the respective code wheels 405. The code wheel grooves 4012 are configured to make way for the code wheels 405 to rotate and prevent the code wheels 405 from moving axially in the movement cavity 4011.

The code wheel assembly 40 further includes a code wheel shaft spring 409 and a protection frame spring 410 disposed at the other end of the code wheel shaft 402, thereby providing an elastic force for the code wheel shaft 402 and the protection frame 408 to move axially. The code wheel assembly 40 further includes a spring mounting seat 411. The spring mounting seat 411 is disposed between the other end of the code wheel shaft 402 and the side wall of the accommodation cavity 101. Both the code wheel shaft spring 409 and the protection frame spring 410 are mounted to the spring mounting seat 411. By providing the spring mounting seat 411, the positioning and installation of the code wheel shaft spring 409 and the protection frame spring 410 is realized, and it is ensured that the code wheel shaft spring 409 and the protection frame spring 410 do not interfere with the relative rotation of the face plate 20 and the knob 10.

Both ends of the protection frame 408 are sleeved on the code wheel shaft 402 and abut against the bushings 404 at both ends of the inner side of the protection frame 408, so that the protection frame 408 can drive the bushings 404 to move.

The first position, the second position and the third position are arranged in sequence, so that the knob 10 is rotated relative to the face plate 20 to achieve the functions of unlocking, automatic code wheel rest and manual password setting in turn when unlocked and to achieve the function of automatic code wheel reset when locked.

The present invention further includes a lock tongue spring 50. The side wall of the accommodation cavity 101 has a rotation rail (not shown in the figures). The lock tongue 30 is mounted at one end of the rotation rail and is movable in a direction perpendicular to the rotation rail. The lock tongue spring 50 is disposed between the lock tongue 30 and the bottom of the accommodation cavity 101. One end of the code wheel shaft 402 is movably fitted between both ends of the rotation rail. One end of the rotation rail, close to the lock tongue 30, is defined as the first position, and the other end of the rotation rail, away from the lock tongue 30, is defined as the third position.

Two sides of the lock tongue 30 have an unlocking slope 301 and a locking slope 302, respectively. The unlocking slope 301 faces the unlocking direction of the code wheel shaft 402 so that the lock tongue 30 provides a component force for moving the code wheel shaft 402 axially along with the rotation of the knob 10. The locking slope 302 faces the locking direction of the code wheel shaft 402, so that the code wheel shaft 402 provides a component force for lowering the lock tongue 30 along with the rotation of the knob 10. One end of the code wheel shaft 402 may have a guide slope 4022 corresponding to the unlocking slope 301 and the locking slope 302 to ensure smoother relative movement of the code wheel shaft 402 and the lock tongue 30.

The present invention further includes an upper rail 60, a lower rail 70 and a rail spring 80 that are installed on the side wall of the accommodation cavity 101. The upper rail 60 and the lower rail 70 are arranged opposite to each other to form the rotation rail. The inner side of the upper rail 60 has a first receiving groove 601 for the protection frame 408 to move axially. A slide slope 602 is connected between the first receiving groove 601 and the inner side of the upper rail 60. The slide slope 602 is disposed between the second position and the third position. The lower rail 70 is disposed opposite to the first receiving groove 601. The rail spring 80 is disposed between the lower rail 70 and the bottom of the accommodation cavity 101. One end of the lower rail 70, close to the lock tongue 30, has a press slope 701. When the protection frame 408 is moved axially to lean against the press slope 701, the lower rail 70 presses the rail spring 80 down to make way for the protection frame 408.

The outer circumference of the lower rail 70 has a second raised block 702. The inner wall of the accommodation cavity 101 has a second engaging groove 1011. The second raised block 702 is inserted into the second engaging groove 1011 to restrict the circular movement of the lower rail 70 on the inner wall of the accommodation cavity 101, so as to ensure the functional stability of the lower rail 70.

The code wheel assembly 40 further includes a positioning member spring 412. The positioning member 407 is pivotally connected to the base 401. One side of the positioning member 407 has pawls 4071 corresponding to the code wheels 405. A third engaging groove 4052 is defined between every adjacent two of code words of the code wheel 405. The pawls 4071 are opposite to the third engaging grooves 4052 of the code wheels 405, respectively. The positioning member spring 412 is disposed between the other side of the positioning member 407 and the base 401 to provide an elastic force to drive the positioning member 407 to rotate for the pawls 4071 to be engaged in the third engaging grooves 4052 of the code wheels 405, so as to restrict the rotation of the code wheels 405 due to the mutual attraction between the reset magnet 403 and the code wheel magnets 406. The bottom of the accommodation cavity 101 has an unlocking lug 1012. The unlocking lug 1012 is opposite to the other side of the positioning member 407. The positioning member 407 movably cooperates with the unlocking lug 1012 along with the rotation of the knob 10. When the positioning member 407 is in contact with the unlocking lug 1012, the pawls 4071 are disengaged from the third engaging grooves 4052 of the code wheels 405. The unlocking lug 1012 is located between the first position and the second position.

The present invention further includes a lock cylinder 90 and a link assembly. The lock cylinder 90 is mounted to the face plate 20 and inserted in the accommodation cavity 101. The link assembly is disposed at the inner end of the lock cylinder 90 and is opposite to the lock tongue 30. When a correct key is inserted in the lock cylinder 90, the lock cylinder 90 is rotated to drive the lock tongue 30 to move through the link assembly, so as to unlock the code wheel shaft 402.

The link assembly includes a push block 100 and a drive block 200. The push block 100 is slidably fitted at the bottom of the accommodation cavity 101, and is movable along the circumferential direction of the accommodation cavity 101.

The push block 100 has a second receiving groove 1001 to make way for the rail spring 80. The drive block 200 is mounted to the inner end of the lock cylinder 90 and configured to drive the push block 100 to move along with the rotation of the lock cylinder 90.

One end of the push block 100, close to the lock tongue 30, has a first downward pressing slope 1002. The first downward pressing slope 1002 faces the lock tongue 30 and is inclined toward the bottom of the accommodation cavity 101 to provide a component force for pressing the lock tongue 30 downward. The lock tongue 30 has a second downward pressing slope 303 opposite to the first downward pressing slope 1002. The first downward pressing slope 1002 is slidably fitted with the second downward pressing slope 303.

The code wheel assembly 40 further includes a probe member 413. The probe member 413 is pivotally connected to the base 401. One side of the probe member 413 has a plurality of probes 4131 corresponding to the respective bushings 404. Each bushing 404 has a probe groove 4043 corresponding to a corresponding one of the probes 4131. When the lock cylinder 90 is rotated, the drive block 200 drives the probe member 413 to rotate for the probes 4131 to be in contact with the surfaces of the bushings 404. When the code wheels 405 are turned until the password is correct, the probes 4131 are inserted into the probe grooves 4043 of the bushings 404, so that the key can be used in conjunction with the turning of the code wheels 405 to look for the set password.

The present invention further includes a bottom plate 300 and a lock member (not shown in the figures). The locking end of the knob 10 has a rotating shaft 102. The bottom plate 300 has a shaft hole 3001. The rotating shaft 102 passes through the shaft hole 3001 and is connected to the lock member. The bottom plate 300 is connected to the face plate 20. The bottom plate 300 can realize the installation of the product on the opening and closing parts, such as cabinet doors, when in use.

The face plate 20 has at least one connecting post 201. The bottom of the accommodation cavity 101 is formed with an arc-shaped hole 1013. The connecting post 201 is fitted in the accommodation cavity 101 and passes through the arc-shaped hole 1013. When the knob 10 is rotated relative to the face plate 20, the arc-shaped hole 1013 is configured to make way for the circular movement of the connecting post 201. The top end of the connecting post 201 is connected to the bottom plate 300. The arc length of the arc-shaped hole 1013 determines the rotatable angle between the face plate 20 and the knob 10. In this embodiment, the top end of the connecting post 201 is locked to the bottom plate 300 by screws.

The face plate 20 has a marked dot 202 corresponding to the third position. The knob 10 has an indication dot 103 for indicating a current rotational position. When the indication dot 103 is aligned with the marked dot 202, it is easy for the user to quickly find the third position where the password is manually set.

The functions that can be achieved by the present invention are explained below through the structural changes of the present invention.

Initial state: FIGS. 9 to 13 illustrate the initial state of the present invention (that is, the locked state set under normal circumstances). Due to the function of automatic code wheel reset of the present invention (referring to the following function explanation) or the user manually scrambles the password, the password is incorrect. The first raised blocks 4021 of the code wheel shaft 402 are not aligned with the first engaging grooves 4041 of the bushings 404, so the code wheel shaft 402 cannot be extended and retracted (the code wheel shaft 402 is always in an extended state under the action of the code wheel shaft spring 409). When the knob 10 is rotated, the code wheel shaft 402 is stuck at the position of the lock tongue 30, and the product is in a locked state. At the same time, the protection frame 408 cannot move axially due to the restriction of the upper rail 60, so that the bushings 404 and the code wheels 405 are relatively stationary and can rotate relative to the code wheel shaft 402. The positioning member spring 412 drives the positioning member 407 to rotate so that the pawls 4071 are engaged in the third engaging grooves 4052 to restrict the rotation of the code wheels 405 due to the mutual attraction between the reset magnet 403 and the code wheel magnets 406. The user turns the code wheels 405 to input the correct password. When the password is input, the code wheels 405 will not be reset automatically to cause invalid input. The lock cylinder 90 is in a default state without a key inserted. The probes 4131 of the probe member 413 are disengaged from the probe grooves 4043, so as not to interfere with the rotation of the bushings 404.

Unlocking: As shown in FIG. 14 and FIG. 15, when the password is correct, the first raised blocks 4021 of the code wheel shaft 402 are aligned with the first engaging grooves 4041 of the bushings 404. The code wheel shaft 402 can be extended and retracted. When the knob 10 is rotated, the lock tongue 30 presses the code wheel shaft 402 to retract (the first raised blocks 4021 are inserted in the first engaging grooves 4041), so that the end of the code wheel shaft 402 passes over the lock tongue 30, that is, the lock is unlocked. The knob 10 can be rotated within a set angle to achieve other functions.

Automatic code wheel reset: As shown in FIGS. 16-18, after the code wheel shaft 402 passes over the lock tongue 30, the protection frame 408 moves along the upper rail 60 and overcomes the elastic force of the protection frame spring 410 and keeps the code wheels 405 to be coupled with the bushings 404. The axial movement of the code wheel shaft 402 enables the first raised blocks 4021 to be disengaged from the first engaging grooves 4041. The positioning member 407 is displaced under the action of the unlocking lug 1012, so that the positioning member 407 is disengaged from the code wheels 405. The code wheels 405 rotate under the action of magnetic force to realize automatic code wheel reset. After that, the positioning member 407 is disengaged from the unlocking lug 1012 and is reset to lock the code wheels 405 under the action of the positioning member spring 412.

Manual password setting: As shown in FIG. 19 and FIG. 20, when the knob 10 is rotated until the indication dot 103 is aligned with the marked dot 202, the password is input at this time. After the correct password is input, the knob 10 is rotated to be in a fully open state. The protection frame 408 continues to overcome the elastic force of the protection frame spring 410 under the action of the upper rail 60, so that the code wheels 405 are coupled with the bushings 404, and the first raised blocks 4021 are disengaged from the first engaging grooves 4041. The lower rail 70 is reset under the action of the rail spring 80. The user can set the password manually by turning the code wheels 405. After the password is set, the knob 10 is turned reversely for the code wheels 405 to be reset again, that is, the code wheels are locked and reset; in this process, if the password is not changed, the code wheels 405 will not act.

Locking: Referring to FIG. 21 and FIG. 22, after the code wheels are locked and reset, the knob 10 is further turned, the code wheel shaft 402 presses the lock tongue 30, and the lock tongue 30 retracts. After the code wheel shaft 402 passes over the lock tongue 30, the lock tongue 30 is reset under the action of the lock tongue spring 50 (not shown in the figures, referring to FIG. 2) to restrict the rotation of the knob 10 to achieve locking.

Unlocking using a key: When the correct key is inserted in the lock cylinder 90 and rotated, the lock cylinder 90 drives the drive block 200 to rotate, the drive block 200 pushes the push block 100, and the push block 100 pushes the lock tongue 30 to retract. At this time, the circumferential restriction between the code wheel shaft 402 and the lock tongue 30 is cancelled, and the lock can be unlocked by rotating the knob 10.

Looking for the password using a key: Referring to FIG. 23 and FIG. 24, the correct key is rotated to rotate the lock cylinder 90. (Generally speaking, the key is rotated in a reverse direction different from the unlocking direction, so as to distinguish the operation of different functions). The lock cylinder 90 drives the drive block 200 to rotate. The drive block 200 drives the probe member 413 to rotate for the probes 4131 to be fitted on the surfaces of the bushings 404. When the code wheels 405 are turned until the password is correct, the probes 4131 are inserted in the probe grooves 4043 to restrict the rotation of the bushings 404. (At this time, the bushings 404 are coupled with the code wheels 405, and both are relatively stationary.) If the code wheels 405 cannot be turned again, it means that the correct password has been got.

Through the above structure, the present invention realizes the function of changing the password through the axial movement of the code wheel shaft 402 and the protection frame 408. Through the action change of the positioning member 407, in cooperation with the reset magnet 403 and the code wheel magnets 406 to realize automatic code wheel reset, the product can automatically scramble the password after unlocking and before locking each time. This reduces the risk of exposing the password greatly and prevents the user from forgetting to scramble the password when the lock is locked.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A code wheel combination lock, comprising:

a knob that is rotatable relative to a face plate, the knob having an accommodation cavity, the face plate being pivotally connected to the accommodation cavity;

a lock tongue, mounted to a side wall of the accommodation cavity; and a code wheel assembly; including:

a base having a movement cavity, the base being mounted to the face plate and located in the accommodation cavity;

a code wheel shaft, passing through the movement cavity and being movable axially relative to the movement cavity, in cooperation with the lock tongue to realize unlocking and locking;

a plurality of sets of bushings and code wheels, the bushings being sleeved on the code wheel shaft and being selectively stationary or rotatable relative to the code wheel shaft along with axial movement of the code wheel shaft, the code wheels being disposed corresponding to the bushings and selectively rotating together with the bushings or rotating relative to the bushings;

a reset mechanism, configured to reset the code wheels;

a positioning member, mounted to the base and disposed opposite to the code wheels for restricting reset of the code wheels;

a protection frame, mounted to the base, the protection frame being movable axially relative to the base for changing the code wheels to rotate together with the bushings or to rotate relative to the bushings;

wherein relative rotation of the knob and the face plate drives the code wheel shaft and the protection frame to move axially and enables the positioning member to restrict or unlock rotation of the code wheels so that the knob can be rotated relative to the face plate to a first position, a second position, or a third position;

in the first position, the code wheel shaft cannot move and is mutually restricted with the lock tongue, when a password is correct, the bushings can rotate relative to the code wheel shaft, the code wheels can rotate together with the bushings, and the positioning member restricts reset of the code wheels;

in the second position, the bushings can rotate relative to the code wheel shaft, the code wheels can rotate together with the bushings, and the positioning member doesn't restrict reset of the code wheels, so as to achieve automatic code wheel reset;

in the third position, the bushings being stationary relative to the code wheel shaft, the code wheels can rotate relative to the bushings, and the positioning member restricts reset of the code wheels, so as to achieve manual password setting.

2. The code wheel combination lock as claimed in claim 1, wherein the reset mechanism further includes code wheel magnets and a reset magnet, the code wheel magnets are disposed corresponding to the code wheels, and the reset magnet is configured to attract the code wheel magnets for resetting the code wheels; the code wheel magnets are arranged in pairs, the code wheels each include one pair of the code wheel magnets with opposite poles; and the reset magnet is arranged along an axial direction of the code wheel shaft and is mounted to the code wheel shaft.

3. The code wheel combination lock as claimed in claim 1, wherein an outer circumference of the code wheel shaft has a plurality of first raised blocks, the bushings correspond to the first raised blocks one by one, an inner wall of each of the bushings is formed with a first engaging groove opposite to a corresponding one of the first raised blocks, the corresponding first raised block is movably fitted in the first engaging groove along with movement of the code wheel shaft;

an outer circumference of each of the bushings has a plurality of restricting protrusions arranged at equal intervals, an inner wall of each of the code wheels has restricting grooves corresponding in position to the restricting protrusions, the restricting protrusions are movably fitted in the restricting grooves;

a side wall of the movement cavity is formed with code wheel grooves corresponding to the respective code wheels, the code wheel grooves are configured to make way for the code wheels to rotate and prevent the code wheels from moving axially in the movement cavity;

the code wheel assembly further includes a code wheel shaft spring and a protection frame spring disposed at one end of the code wheel shaft, away from the lock tongue, to provide an elastic force for the code wheel shaft and the protection frame to move axially; the code wheel assembly further includes a spring mounting seat, the spring mounting seat is disposed between the end of the code wheel shaft away from the lock tongue and the side wall of the accommodation cavity, and the code wheel shaft spring and the protection frame spring are mounted to the spring mounting seat.

4. The code wheel combination lock as claimed in claim 1, wherein the first position, the second position and the third position are arranged in sequence, so that the knob is rotated relative to the face plate to achieve functions of unlocking, automatic code wheel reset and manual password setting in turn when unlocked and to achieve the function of automatic code wheel reset when locked.

5. The code wheel combination lock as claimed in claim 4, further comprising a lock tongue spring, the side wall of the accommodation cavity having a rotation rail, the lock tongue being mounted at one end of the rotation rail and movable in a direction perpendicular to the rotation rail, the lock tongue spring being disposed between the lock tongue and a bottom of the accommodation cavity, one end of the code wheel shaft being movably fitted between both ends of the rotation rail, one end of the rotation rail, close to the lock tongue, being defined as the first position, the other end of the rotation rail, away from the lock tongue, being defined as the third position.

6. The code wheel combination lock as claimed in claim 5, wherein two sides of the lock tongue have an unlocking slope and a locking slope respectively; the unlocking slope faces an unlocking direction of the code wheel shaft, so that the lock tongue provides a component force for moving the code wheel shaft axially along with rotation of the knob; the locking slope faces a locking direction of the code wheel shaft, so that the code wheel shaft provides a component force for lowering the lock tongue along with rotation of the knob.

7. The code wheel combination lock as claimed in claim 5, wherein further comprising an upper rail, a lower rail and a rail spring installed on the side wall of the accommodation cavity, the upper rail and the lower rail being arranged opposite to each other to form the rotation rail; an inner side of the upper rail having a first receiving groove for the protection frame to move axially, a slide slope being connected between the first receiving groove and the inner side of the upper rail, the slide slope being disposed between the second position and the third position; the lower rail being disposed opposite to the first receiving groove; the rail spring being disposed between the lower rail and the bottom of the accommodation cavity; one end of the lower rail, close to the lock tongue, having a press slope, wherein when the protection frame is moved axially to lean against the press slope, the lower rail presses the rail spring down to make way for the protection frame.

8. The code wheel combination lock as claimed in claim 1, wherein the code wheel assembly further includes a positioning member spring; the positioning member is pivotally connected to the base, one side of the positioning member has pawls corresponding to the code wheels, a third engaging groove is defined between every adjacent two of code words of each of the code wheels, the pawls are opposite to the third engaging grooves of the code wheels, respectively; the positioning member spring is disposed between another side of the positioning member and the base to provide an elastic force to drive the positioning member to rotate for the pawls to be engaged in the third engaging grooves of the code wheels, respectively; a bottom of the accommodation cavity has an unlocking lug, the unlocking lug is opposite to the another side of the positioning member, the positioning member movably cooperates with the unlocking lug along with rotation of the knob, when the positioning member is in contact with the unlocking lug, the pawls are disengaged from the third engaging grooves of the code wheels, and the unlocking lug is located between the first position and the second position.

9. The code wheel combination lock as claimed in claim 1, further comprising a lock cylinder and a link assembly, the lock cylinder being mounted to the face plate and inserted in the accommodation cavity, the link assembly being disposed at an inner end of the lock cylinder and being opposite to the lock tongue; wherein when a correct key is inserted in the lock cylinder, the lock cylinder is rotated to drive the lock tongue to move through the link assembly, so as to unlock the code wheel shaft; the link assembly including a push block and a drive block, the push block being slidably fitted at a bottom of the accommodation cavity and being movable along a circumferential direction of the accommodation cavity, the push block having a second receiving groove to make way for the rail spring; the drive block being mounted to the inner end of the lock cylinder and configured to drive the push block to move along with rotation of the lock cylinder;

the code wheel assembly further including a probe member, the probe member being pivotally connected to the base, one side of the probe member having a plurality of probes corresponding to the respective bushings, each of the bushings having a probe groove corresponding to a corresponding one of the probes; wherein when the lock cylinder is rotated, the drive block drives the probe member to rotate for the probes to be in contact with surfaces of the respective bushings, when the password is correct, the probes are inserted into the probe grooves of the bushings, respectively.

10. The code wheel combination lock as claimed in claim 1, wherein the face plate has a marked dot corresponding to the third position, and the knob has an indication dot for indicating a current rotational position.

* * * * *